(12) United States Patent
Ishida

(10) Patent No.: US 9,959,488 B2
(45) Date of Patent: May 1, 2018

(54) TAPE PRINTER FOR RECEIVING TALK DATA INCLUDING SPEECH RELATED DATA AND FORMING PRINT OBJECTS CORRESPONDING TO SPEECH RELATED DATA ON TAPE

(71) Applicant: Brother Kogyo Kabushiki Kaisha, Nagoya-shi, Aichi-ken (JP)

(72) Inventor: Minako Ishida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days. days.

(21) Appl. No.: 15/460,324

(22) Filed: Mar. 16, 2017

(65) Prior Publication Data

US 2017/0372177 A1 Dec. 28, 2017

(30) Foreign Application Priority Data

Jun. 27, 2016 (JP) .................................. 2016-126730

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |
| *G06K 15/02* | (2006.01) |
| *G10L 15/26* | (2006.01) |
| *G06K 1/12* | (2006.01) |
| *G06F 17/24* | (2006.01) |

(52) U.S. Cl.
CPC ........... *G06K 15/022* (2013.01); *G06F 17/24* (2013.01); *G06K 1/121* (2013.01); *G06K 15/005* (2013.01); *G10L 15/265* (2013.01)

(58) Field of Classification Search
CPC .. G06K 15/022; G06K 15/005; G06K 15/265; G06K 1/121; G06F 17/24
USPC ......................... 358/1.6, 1.1, 1.15, 1.13, 1.14
See application file for complete search history.

(56) References Cited

U.S. PATENT DOCUMENTS

| | | | |
|---|---|---|---|
| 8,385,962 B1 * | 2/2013 | Gailloux | H04W 4/10 455/518 |
| 2013/0166275 A1 | 6/2013 | Yang et al. | |
| 2015/0286790 A1 * | 10/2015 | Ahmad | G06F 17/2705 705/2 |

FOREIGN PATENT DOCUMENTS

| | | |
|---|---|---|
| JP | H05-305750 A | 11/1993 |
| JP | 2015-179519 A | 10/2015 |

* cited by examiner

*Primary Examiner* — Douglas Tran
(74) *Attorney, Agent, or Firm* — Banner & Witcoff, Ltd.

(57) ABSTRACT

A tape printer including a data receiving portion, a display control portion, and a print control portion is provided. The data receiving portion is configured to receive talk data containing plural pieces of speech related data along a time series, the speech related data including speech display texts from each of a first speaker and a second speaker. The display control portion is configured to control the display device so that the plural pieces of speech related data is arrayed and displayed in order of the time series along a tape length direction, and first and second speech related data respectively in relation to the first and second speaker contained in the talk data are displayed in mutually different forms. The print control portion is configured to control a printing head to form a plurality of print objects corresponding respectively to the plural pieces of speech related data.

14 Claims, 17 Drawing Sheets

[FIG. 1]
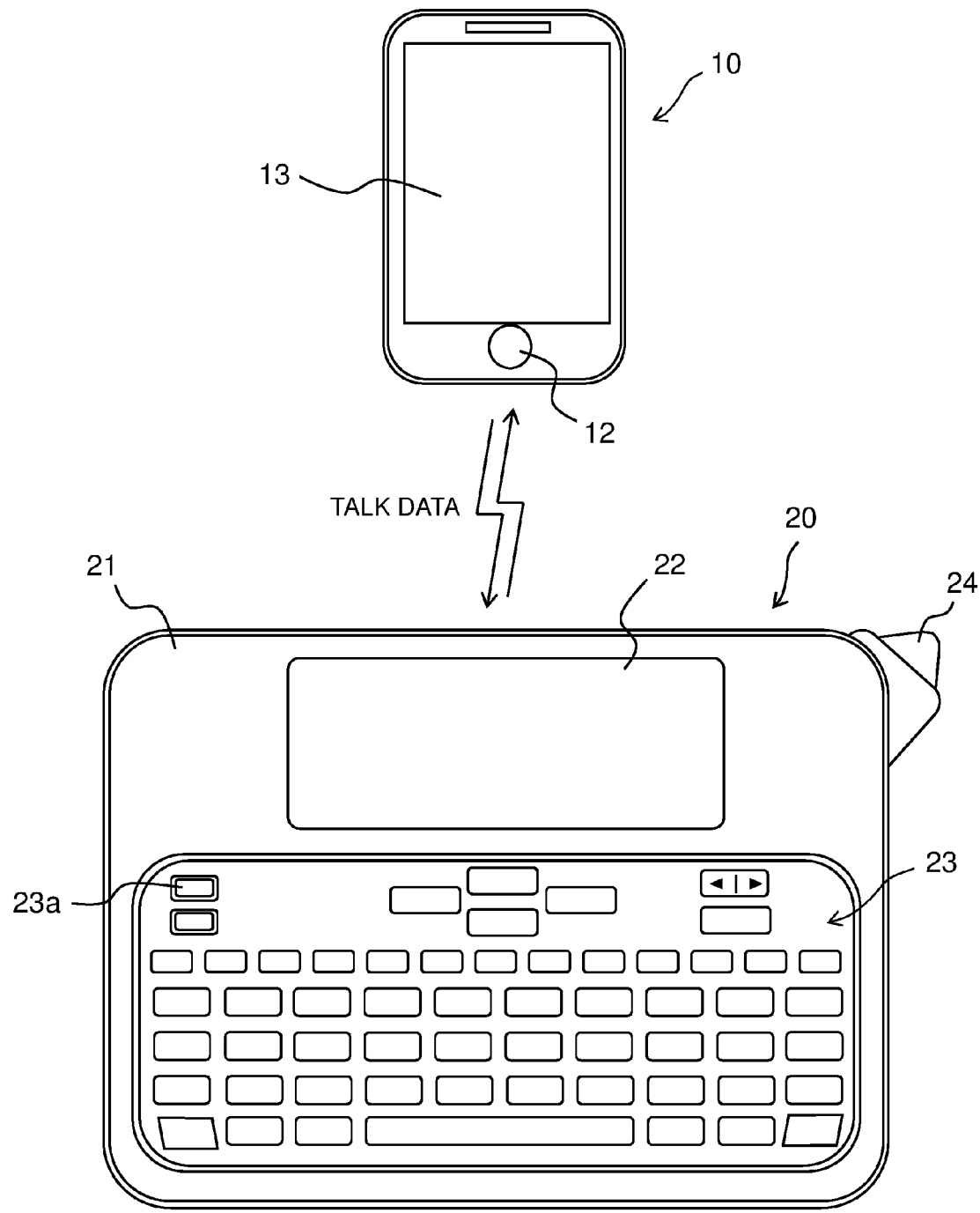

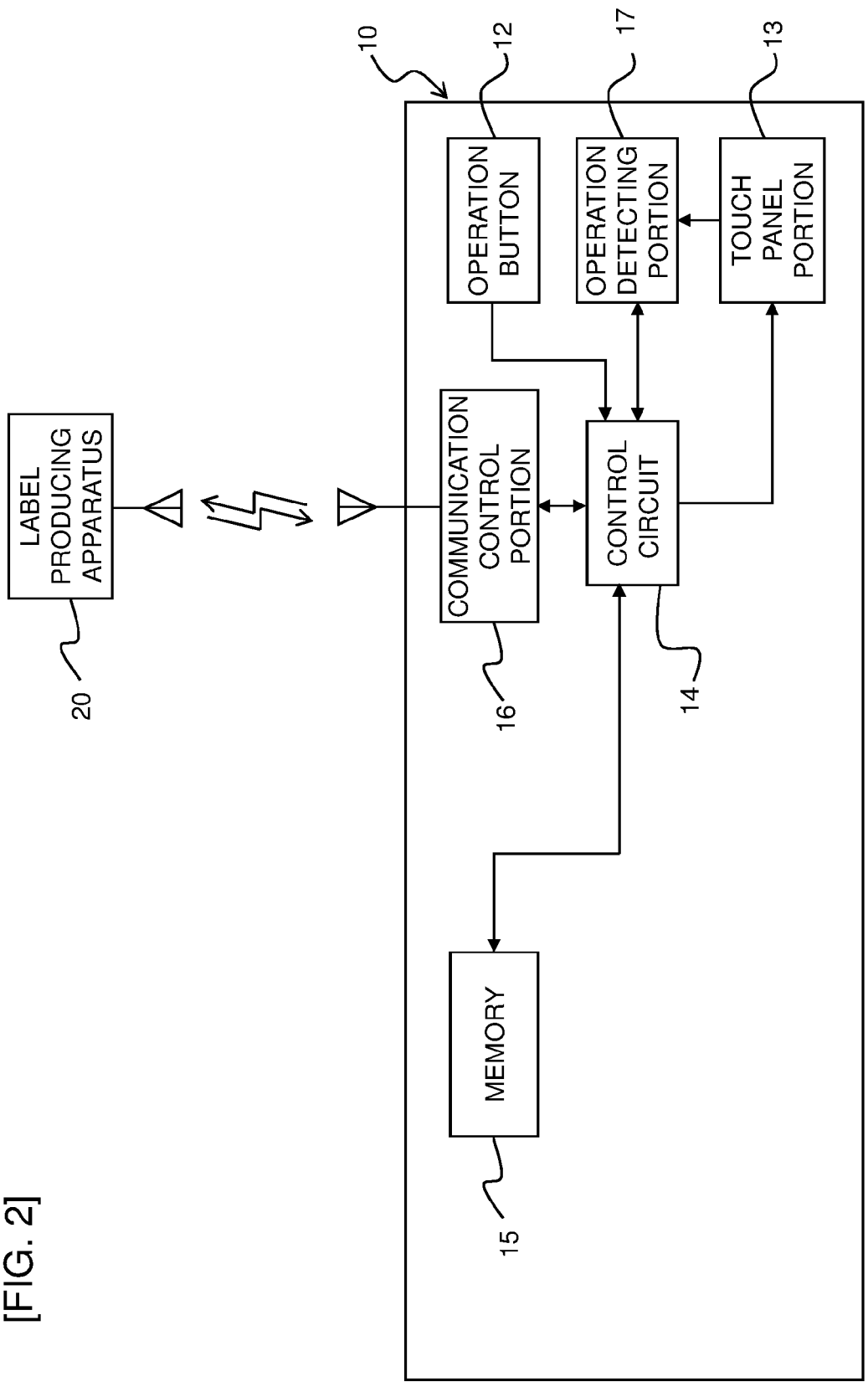
[FIG. 2]

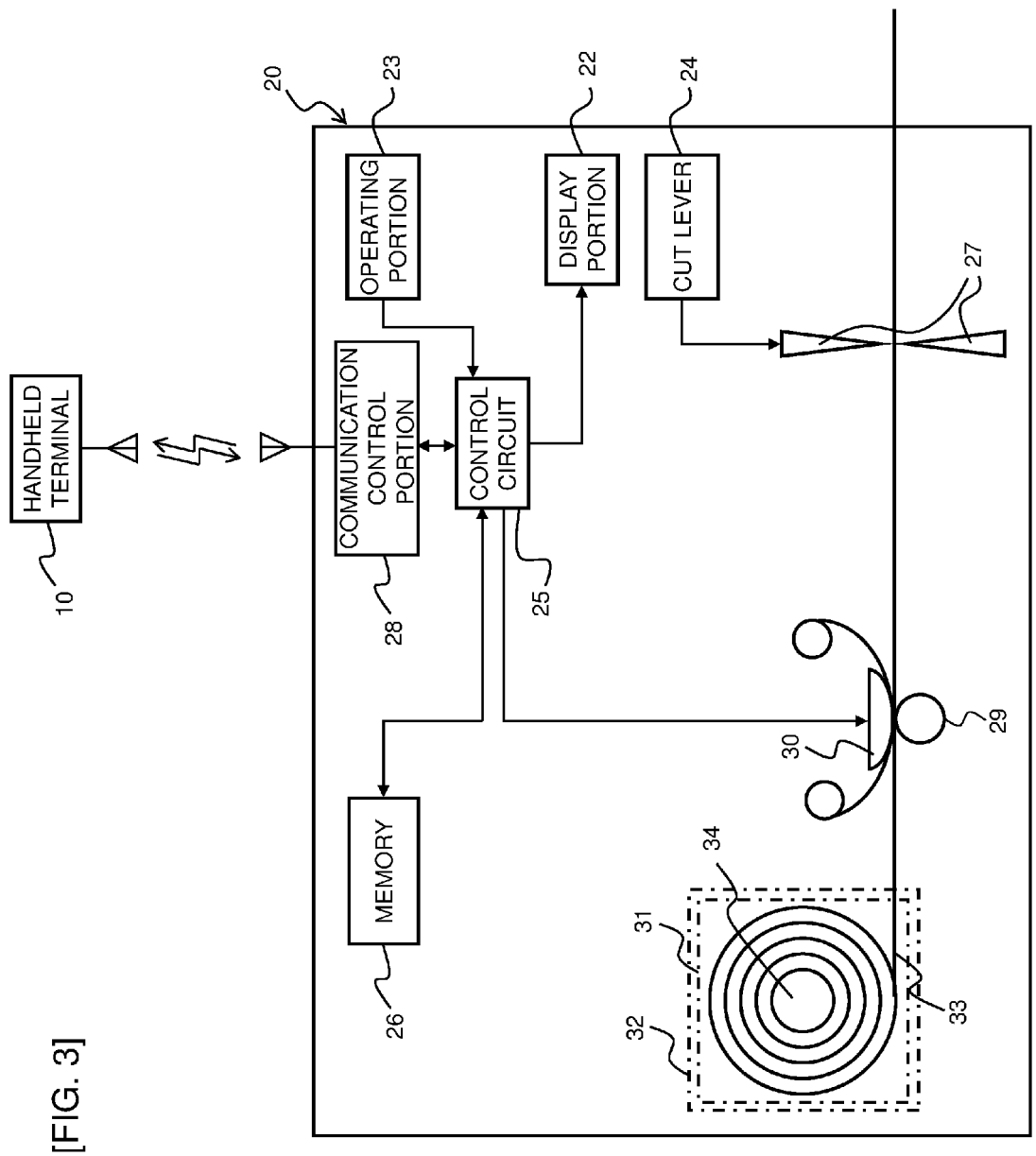
[FIG. 3]

[FIG. 4]
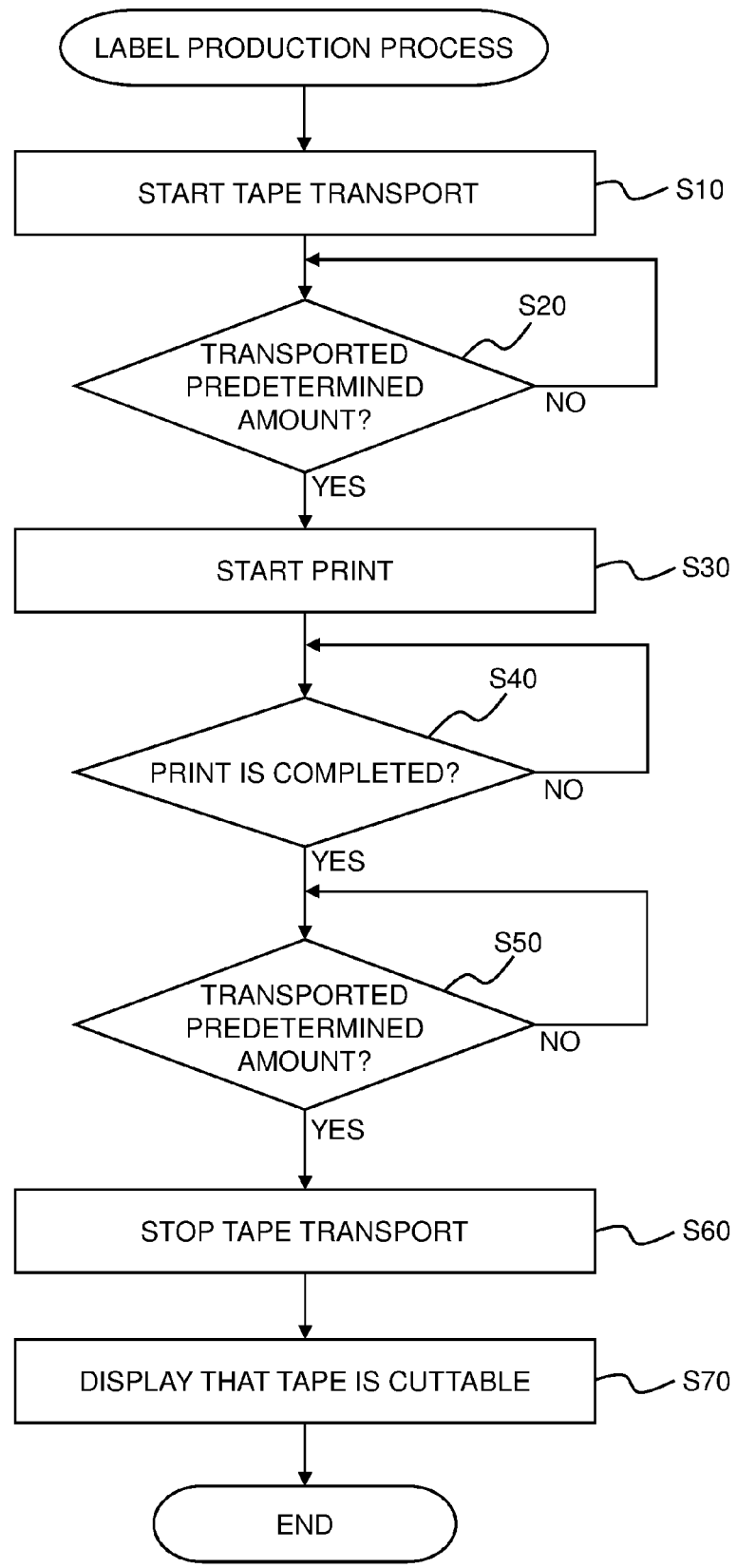

[FIG. 5]
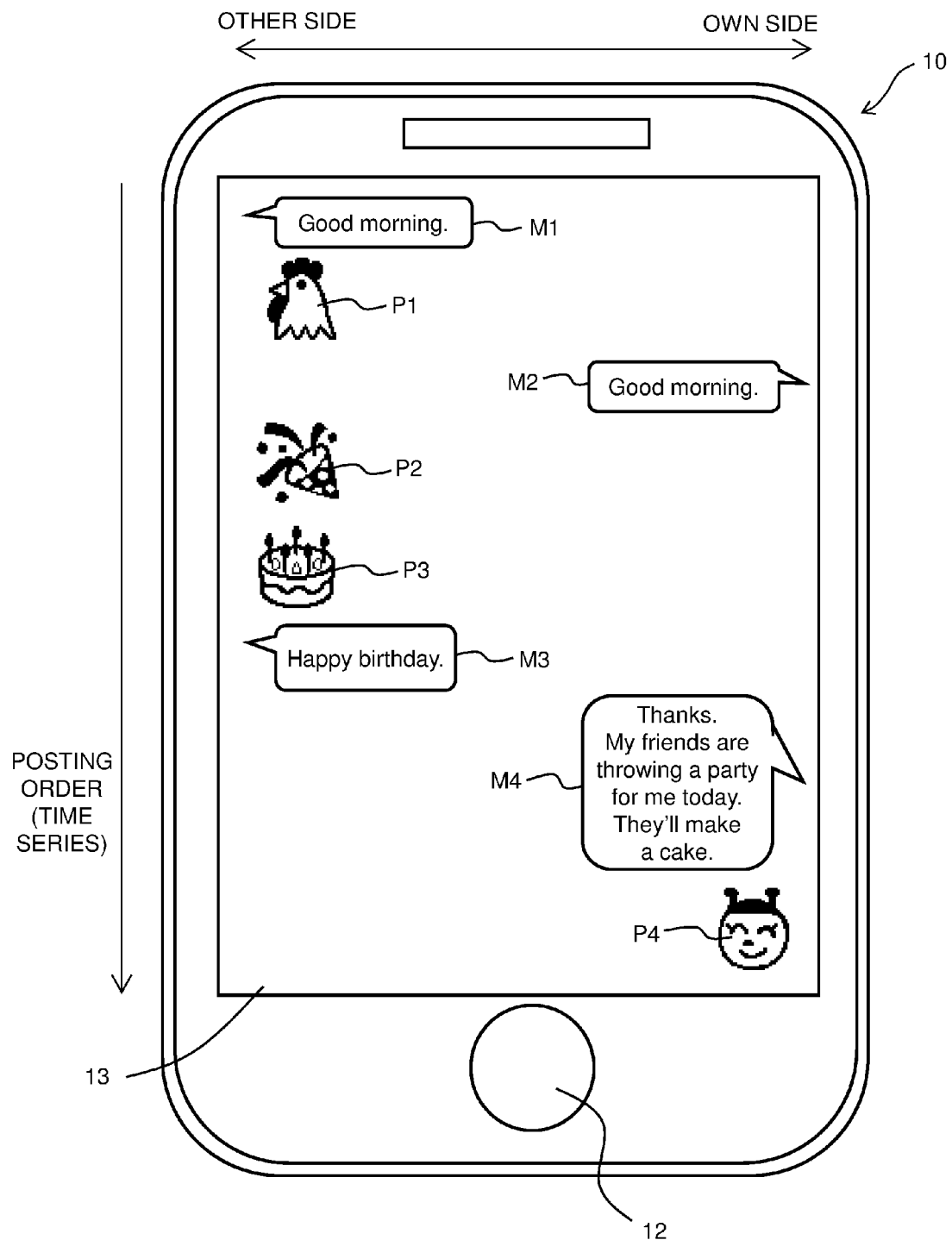

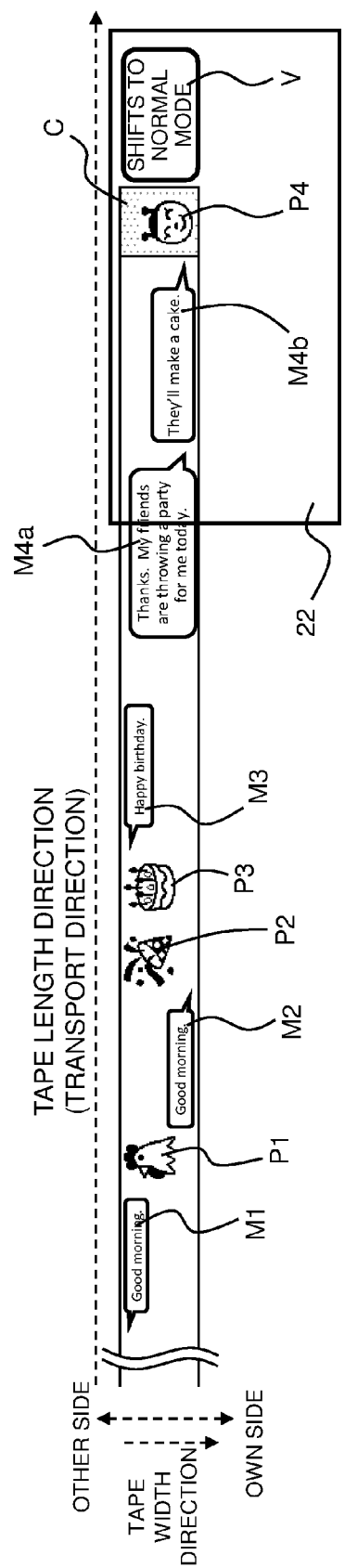

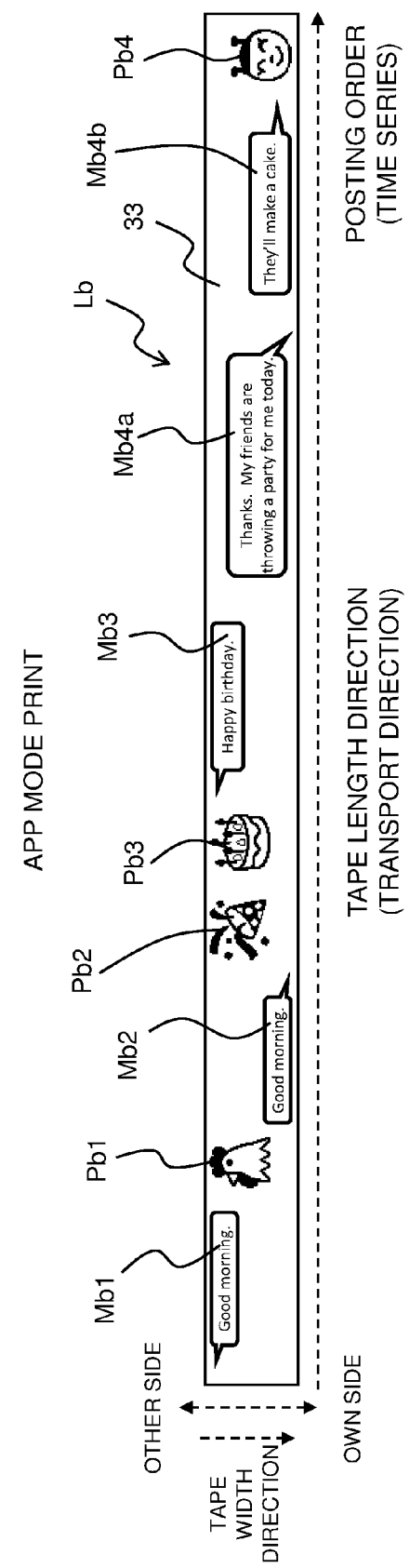

[FIG. 8]

SELECT DATA PERIOD FOR EDIT/PRINT
☑ PARTIAL SELECTION
 ・START : 2016年 05月 08日
        →
 ・END  : 2016年 05月 08日

☐ ALL SELECTION

22

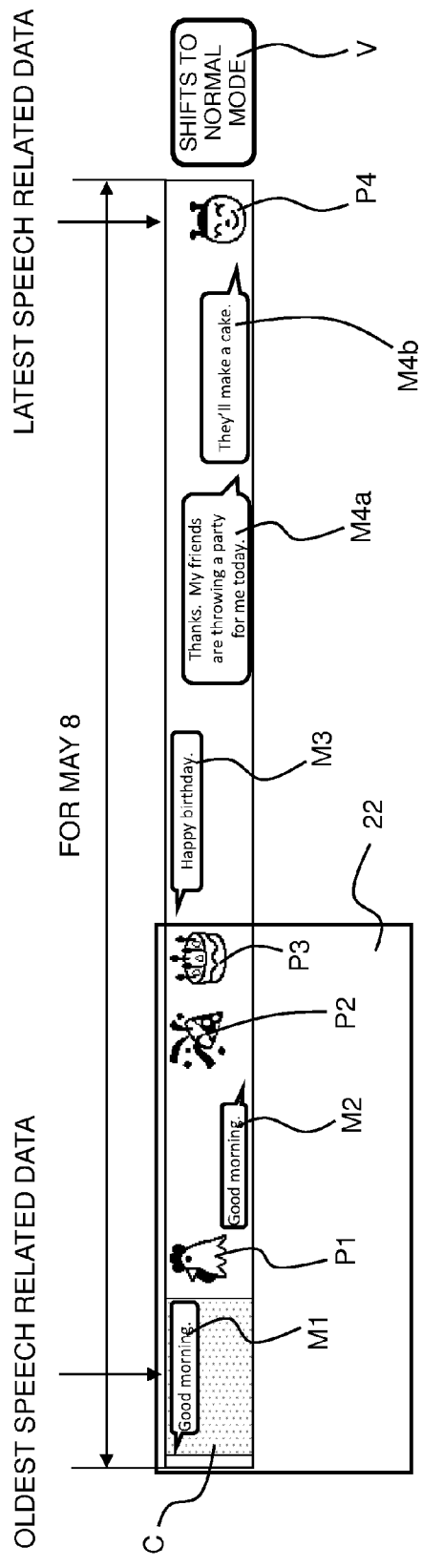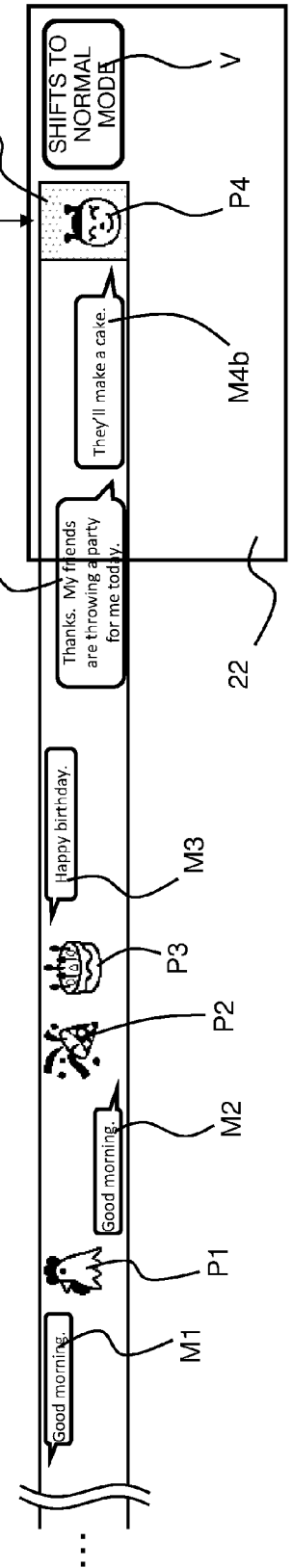

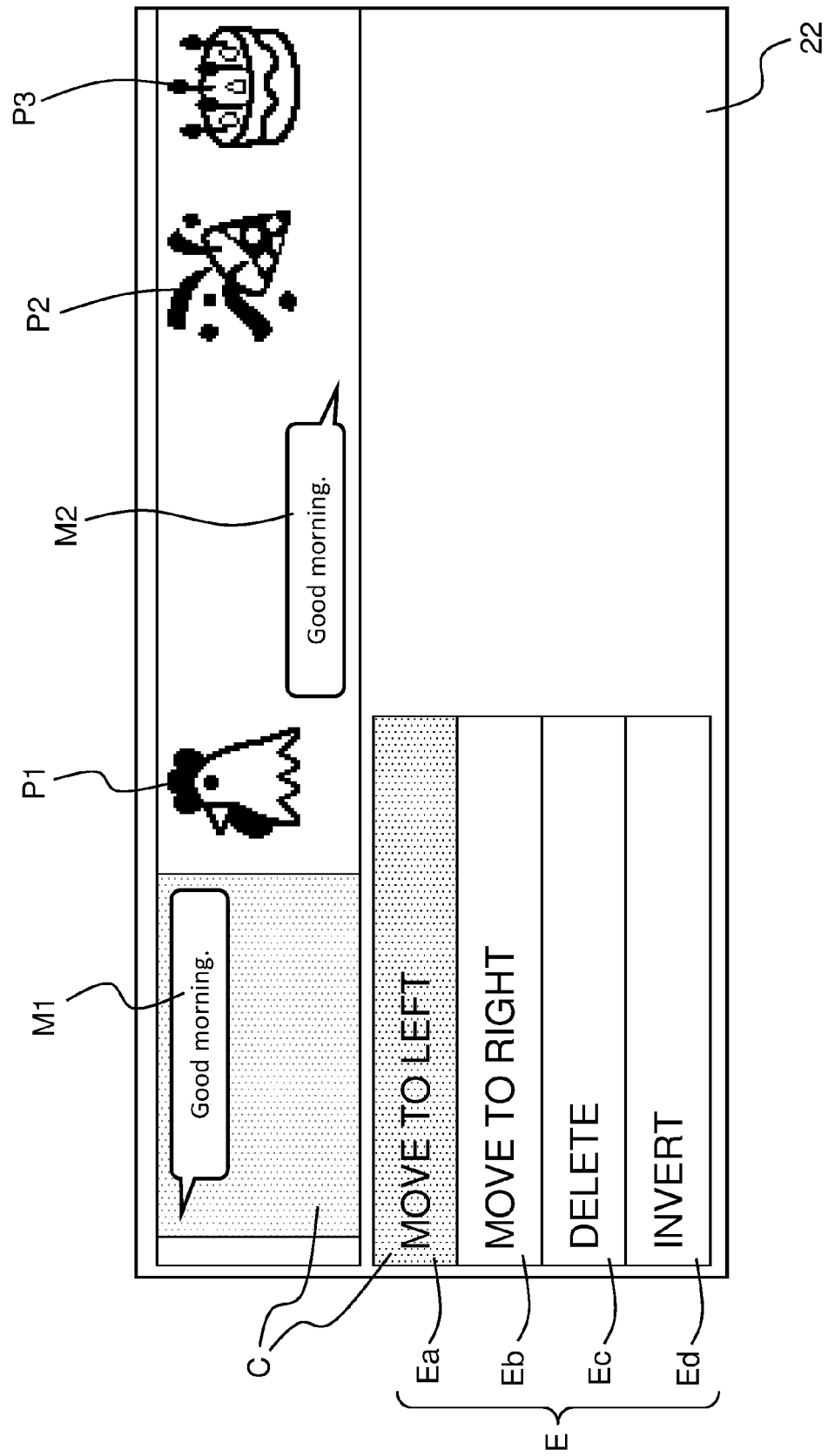

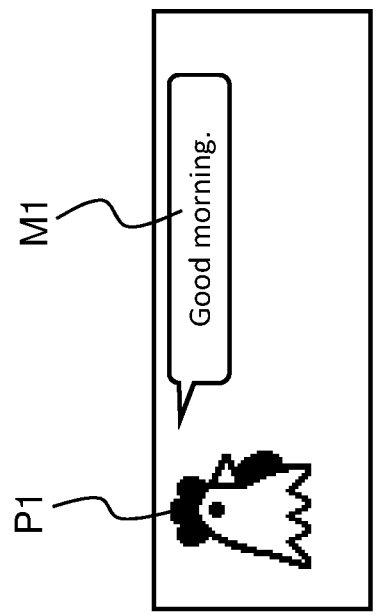
[FIG. 11A]
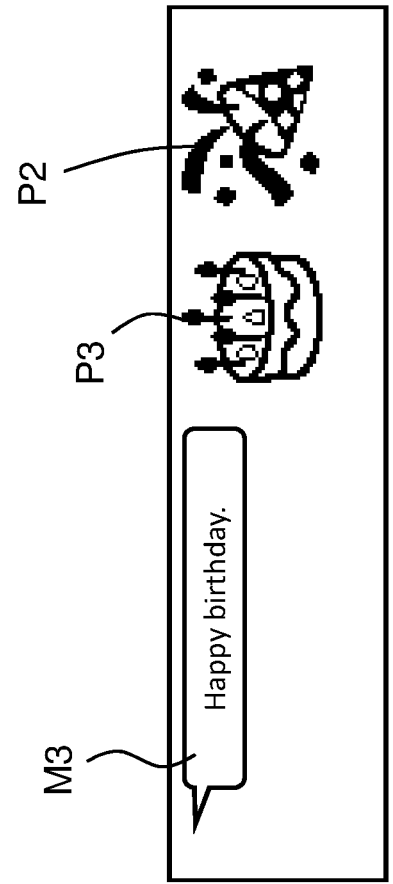
[FIG. 11B]

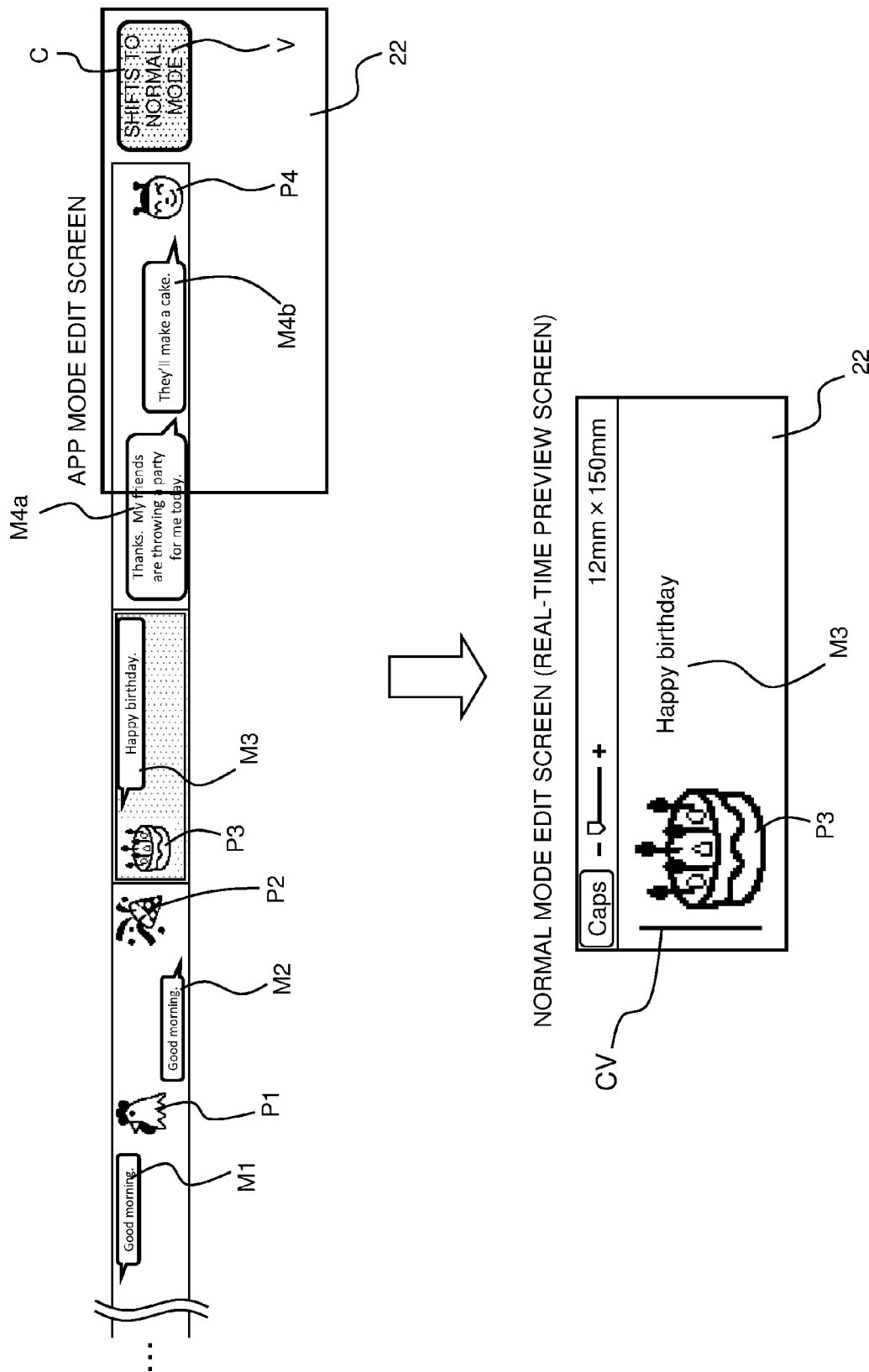

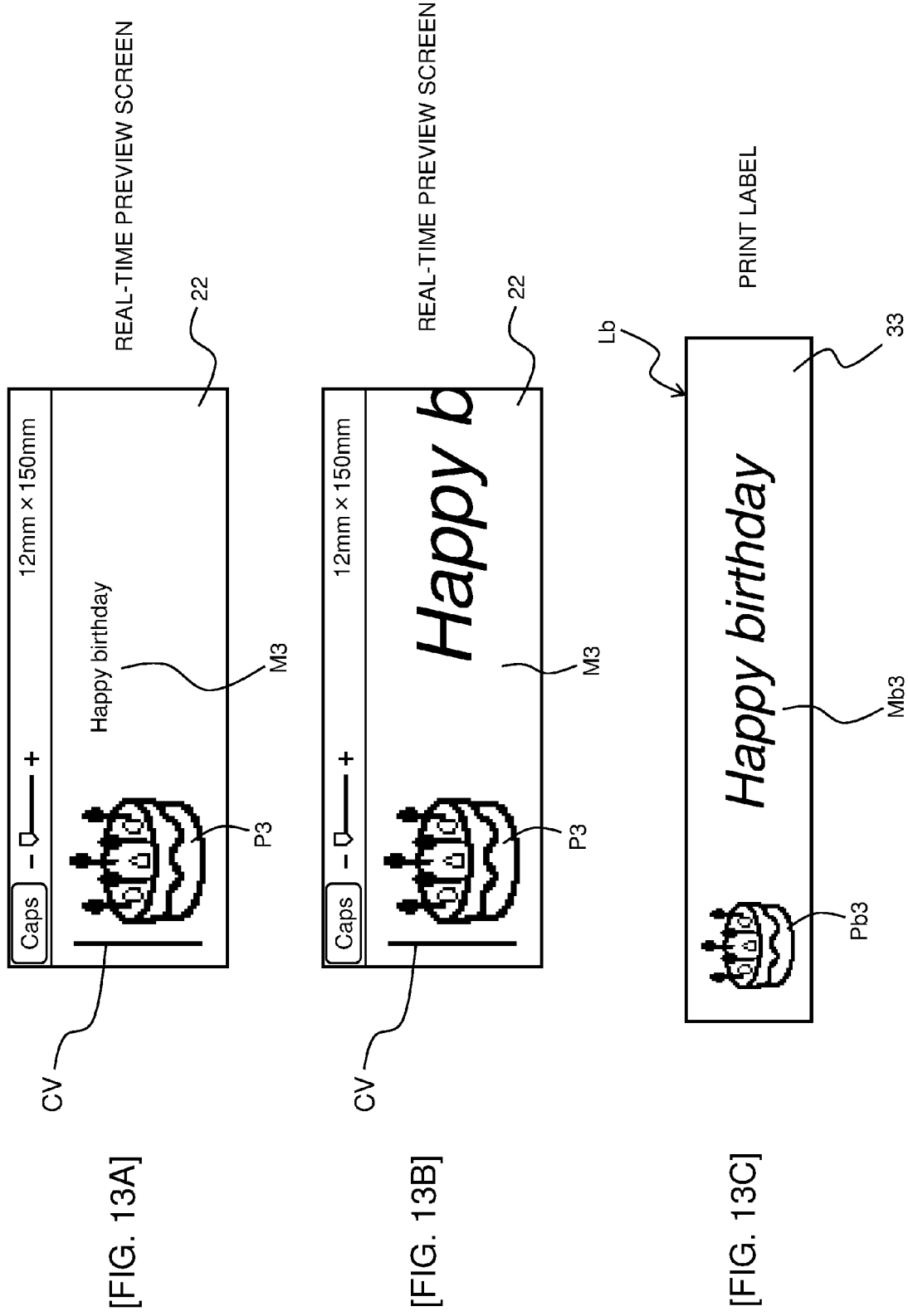

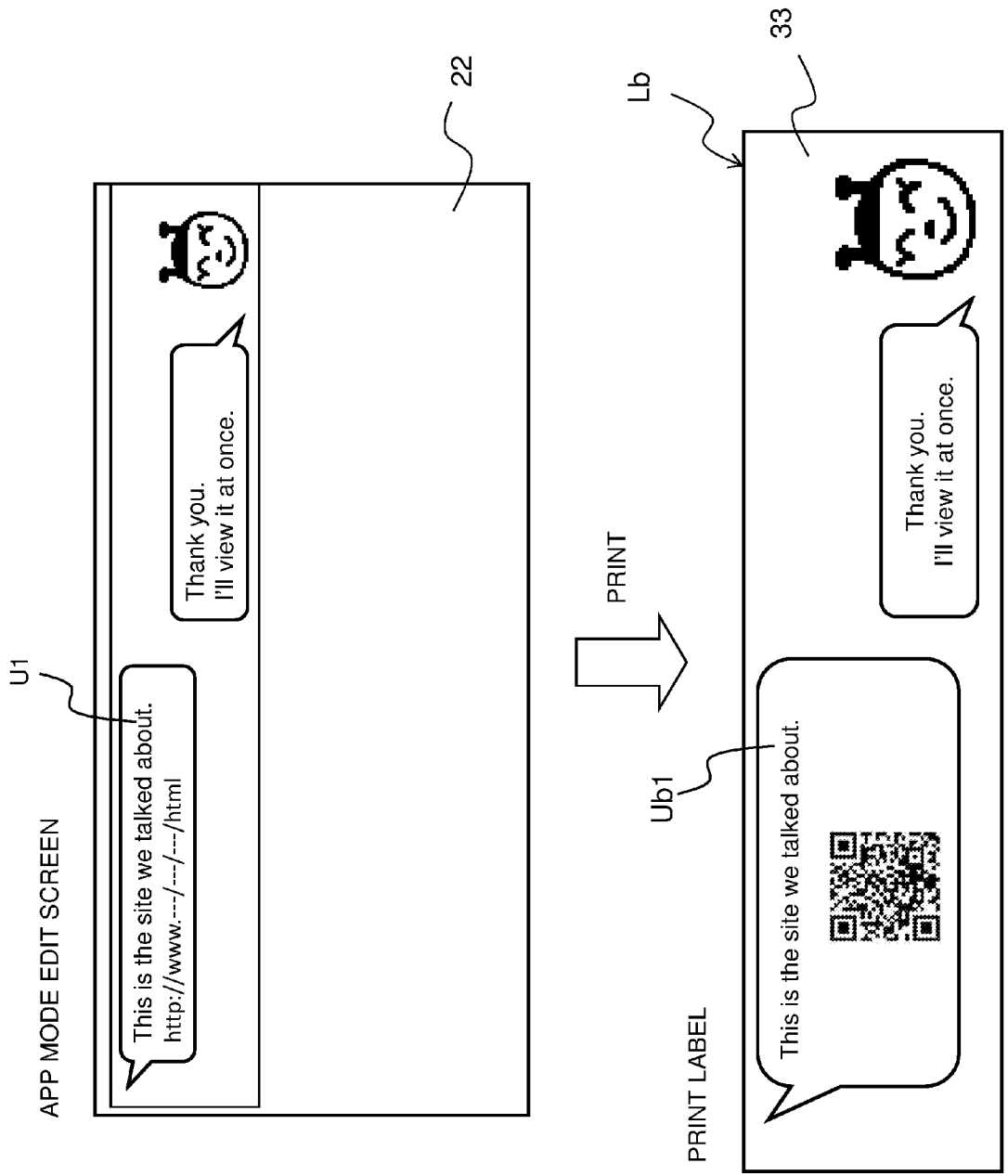

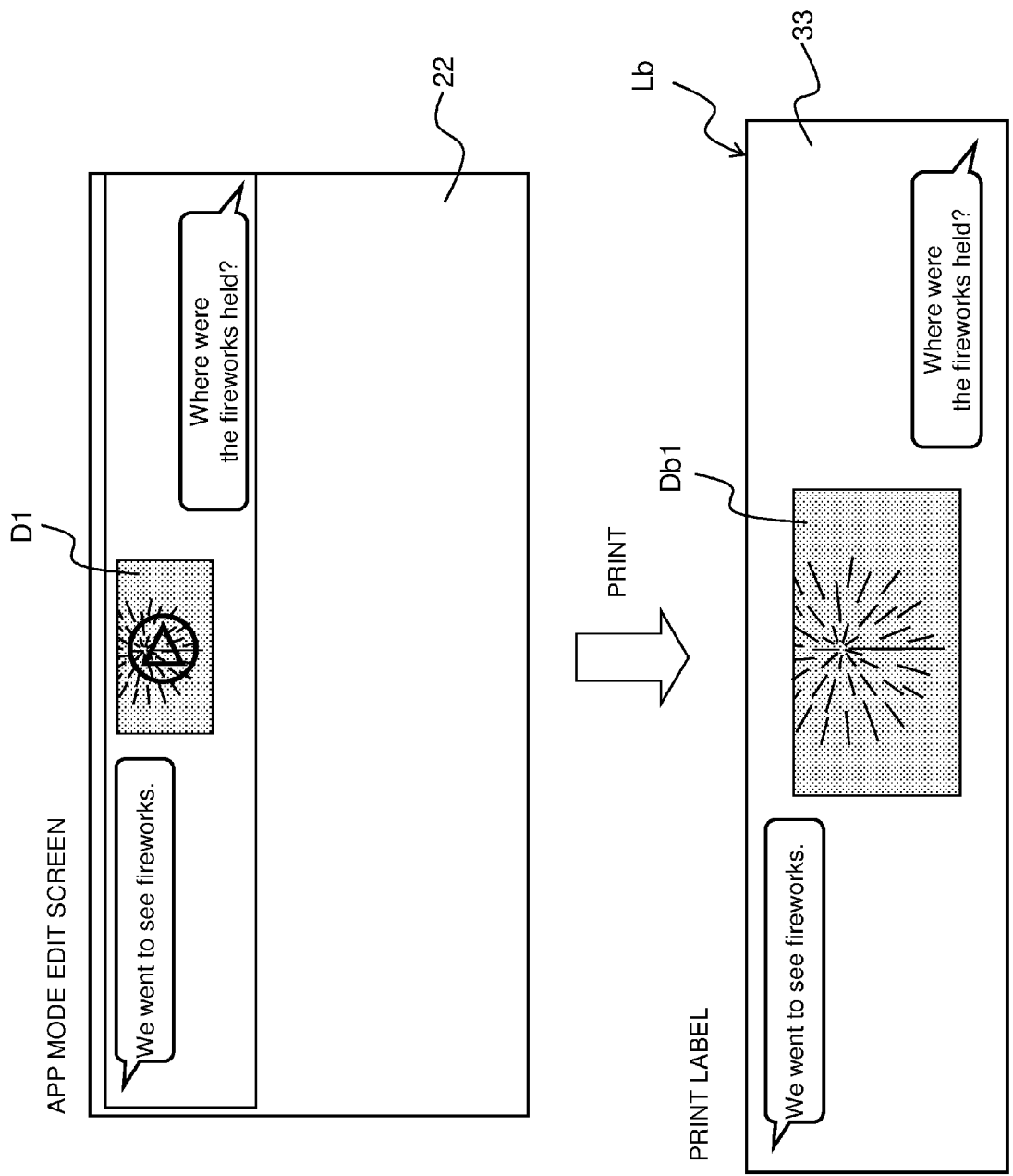

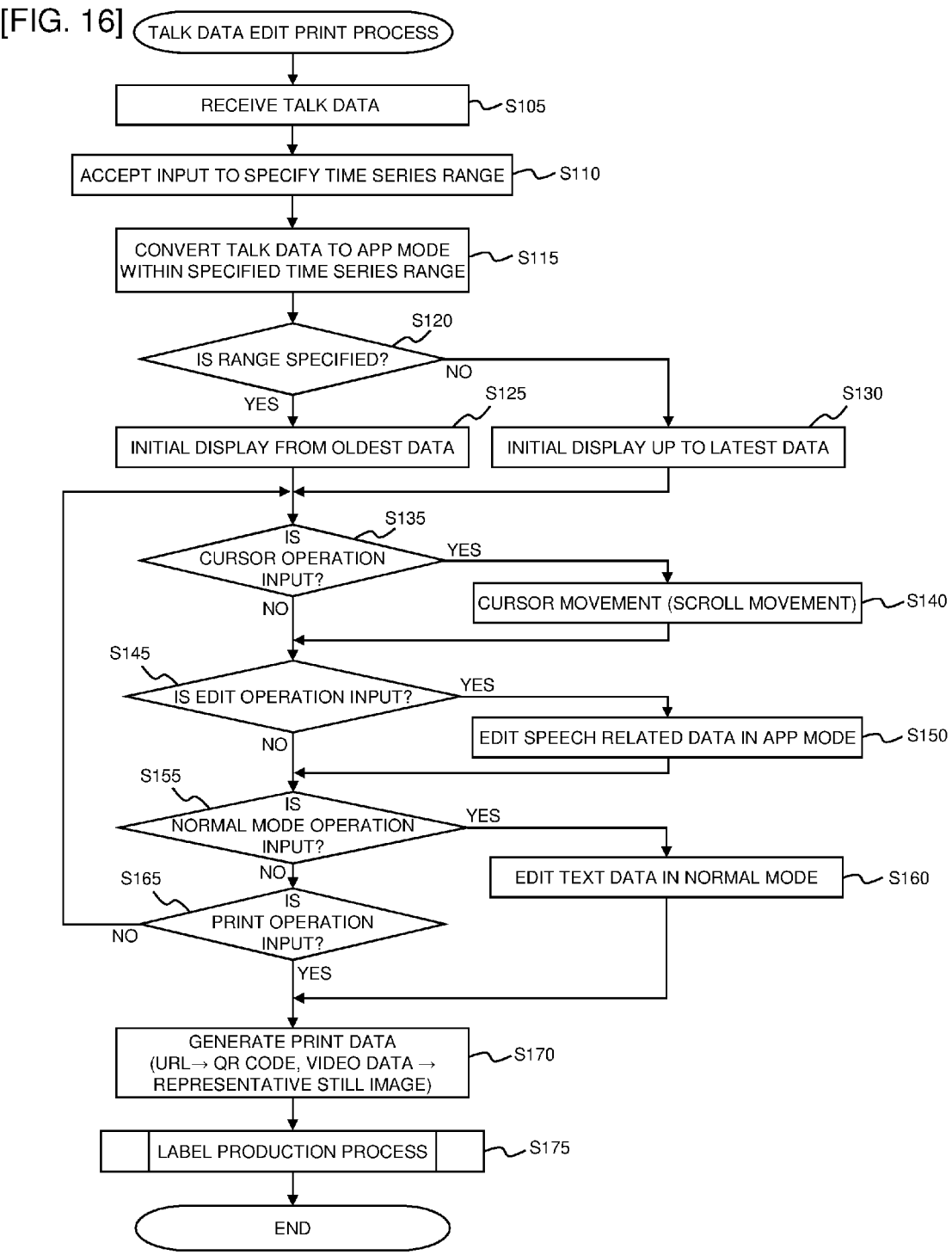

[FIG. 17]
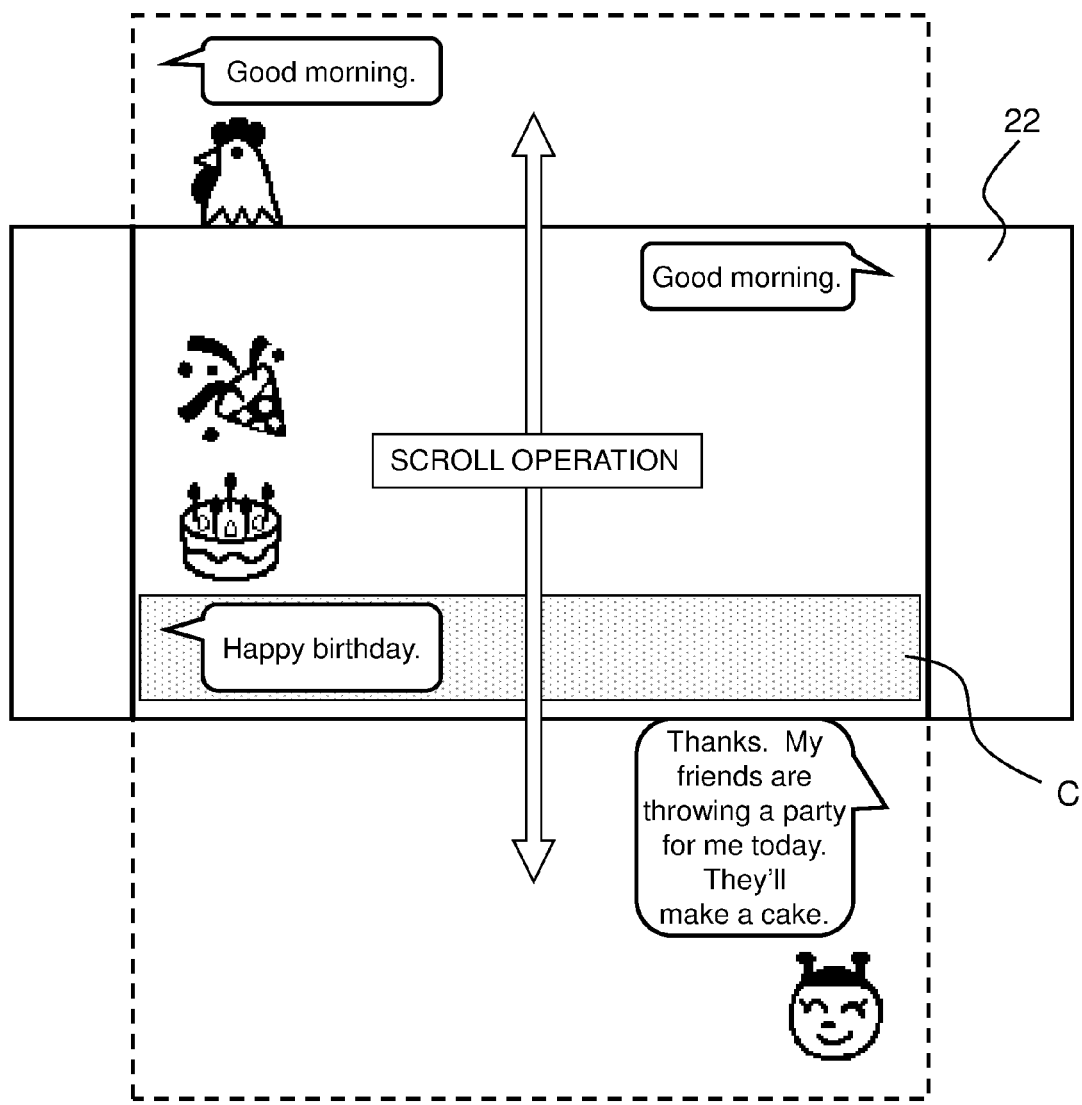

TAPE PRINTER FOR RECEIVING TALK DATA INCLUDING SPEECH RELATED DATA AND FORMING PRINT OBJECTS CORRESPONDING TO SPEECH RELATED DATA ON TAPE

CROSS-REFERENCE TO RELATED APPLICATION

The present application claims priority from Japanese Patent Application No. 2016-126730, which was filed on Jun. 27, 2016, the disclosure of which is incorporated herein by reference in its entirety.

BACKGROUND

Field

The present disclosure relates to a tape printer printing talk data generated by an instant messaging app on a print-receiving tape and to a recording medium storing a talk data processing program.

Description of the Related Art

An instant messaging app has hitherto been known that displays the content of conversation exchanged between yourself and others via a communication network. This app allows text-format short messages, stereotyped images such as stamps, any images and videos, or uniform resource locators (URLs) to be posted as the content of conversation, arranging them in order of time series for listing while distinguishing them by speaker.

In recent years, there occurs a new need to perform printing on a print-receiving medium (tape) by a printing device, using as talk data the content of conversation in the instant messaging app, to produce printed matter (labels). At that time, there also occurs a request for printing using talk data optionally edited from the content of conversation in the app. In such a case, if the talk data is printed with an unchanged listing layout while correlating the length direction of a tape that is a print-receiving medium with a time-series direction in the prior art, a text indicative of the conversation content is inconveniently reduced so as to fit the narrow tape width, rendering difficult the interpretation of the conversation content, distinction of the speaker, and edit thereof.

SUMMARY

It is therefore an object of the present disclosure to provide a tape printer and a recording medium storing a talk data processing program, capable of clearly distinctively visually recognizing the conversation content of talk data on the tape by speaker, to ensure easy execution of a desired edit.

In order to achieve the above-described object, according to the first aspect of the present application, there is provided a tape printer comprising a feeder, a printing head, a display device, a data receiving portion, a display control portion, and a print control portion. The feeder is configured to feed a print-receiving tape. The printing head is configured to perform printing on the print-receiving tape fed by the feeder. The display device is configured to perform a desired display. The data receiving portion is configured to receive talk data via wireless communication, the talk data containing plural pieces of speech related data along a time series, the speech related data including at least one of speech display texts, a posted image, a posted video, and a posted uniform resource locator (URL) from each of a plurality of speakers including a first speaker and a second speaker. The display control portion is configured to control the display device so that a preview display of the print-receiving tape is performed, at least some of the plural pieces of speech related data contained in the talk data along the time series is arrayed and displayed in order of the time series along a tape length direction in the preview display, and first speech related data in relation to the first speaker contained in the talk data and second speech related data in relation to the second speaker contained in the talk data are displayed in mutually different forms. The print control portion is configured to control the printing head so as to form on the print-receiving tape a plurality of print objects arrayed along the tape length direction, the print objects corresponding respectively to the plural pieces of speech related data arrayed long the tape length direction in the preview display of the display device.

In order to achieve the above-described object, according to the second aspect of the present application, there is provided a non-transitory computer-readable recording medium, storing a talk data processing program for executing steps on a CPU included in a tape printer that has a feeder configured to feed a print-receiving tape, a printing head configured to perform printing on the print-receiving tape fed by the feeder, a display device configured to perform a desired display, and the CPU. The steps comprises a data receiving step and a display control step. In the data receiving step, talk data is received via wireless communication, the talk data containing plural pieces of speech related data along a time series, the speech related data including at least one of speech display texts, a posted image, a posted video, and a posted uniform resource locator (URL) from each of a plurality of speakers including a first speaker and a second speaker. In the display control step, the display device is controlled so that a preview display of the print-receiving tape is performed, at least some of the plural pieces of speech related data contained in the talk data along the time series is arrayed and displayed in order of the time series along a tape length direction in the preview display, and first speech related data in relation to the first speaker contained in the talk data and second speech related data in relation to the second speaker contained in the talk data are displayed in mutually different forms.

BRIEF DESCRIPTION OF THE DRAWINGS

FIG. 1 is a front view showing a label producing apparatus in an embodiment of the present disclosure and a handheld terminal connected thereto in a manner capable of sending and reception of information.

FIG. 2 is a function block diagram showing a functional configuration of the handheld terminal.

FIG. 3 is a function block diagram showing a functional configuration of the label producing apparatus.

FIG. 4 is a flowchart showing a label production process control procedure executed by a control circuit of the label producing apparatus.

FIG. 5 is a view showing a display example of talk data displayed on a touch panel portion of the handheld terminal by an instant messaging app.

FIG. 6 is a view showing a display example of the talk data of FIG. 5, displayed on a display portion of the label producing apparatus after conversion of the talk data to an app mode.

FIG. 7 is a view showing a print example of a print label produced by the label producing apparatus on the basis of the talk data shown in FIG. 5.

FIG. 8 is a view showing a display example of a selection screen appearing on the display portion of the label producing apparatus.

FIG. 9A is a view of a case where "partial selection" is selected, in the display example of the talk data of FIG. 5, displayed on the display portion of the label producing apparatus after conversion of the talk data to the app mode.

FIG. 9B is a view of a case where "all selection" is selected, in the display example of the talk data of FIG. 5, displayed on the display portion of the label producing apparatus after conversion of the talk data to the app mode.

FIG. 10 is a view showing a display example where an edit process menu is displayed on an app mode edit screen.

FIG. 11A is a view showing a first example of edit process in a print example of a print label printed reflecting the edit process on the app mode edit screen.

FIG. 11B is a view showing a second example of edit process in the print example of the print label printed reflecting the edit process on the app mode edit screen.

FIG. 12 is a view showing a display example where the screen shifts from the app mode edit screen to a normal mode edit screen.

FIG. 13A is an explanatory view of the edit process on the normal mode edit screen, showing a display example of original speech related data.

FIG. 13B is an explanatory view of the edit process on the normal mode edit screen, showing a processing example of a text edit process.

FIG. 13C is an explanatory view of the edit process on the normal mode edit screen, showing a print example of a print label printed reflecting the text edit process.

FIG. 14 is a view showing a display example and a print example in the case of printing talk data containing speech related data of a posted URL.

FIG. 15 is a view showing a display example and a print example in the case of printing talk data containing speech related data of a posted video.

FIG. 16 is a flowchart showing a talk data edit/print process control procedure executed by the control circuit of the label producing apparatus.

FIG. 17 is a view showing a display example where talk data is displayed and scrolled on the touch panel portion of the label producing apparatus.

DETAILED DESCRIPTION OF THE PREFERRED EMBODIMENTS

An embodiment of the present disclosure will now be described with reference to the drawings.

The embodiment of the present disclosure is described using FIGS. 1 to 16.

In this embodiment, a case will be described by way of example where talk data is received from a handheld terminal, displayed, edited, and printed to produce a print label, in accordance with a talk data processing program run by a label producing apparatus.

<Schematic Configuration of Handheld Terminal and Label Producing Apparatus>

As shown in FIG. 1, a handheld terminal 10 is used to send talk data generated through execution of an instant messaging app to a label producing apparatus 20 that is a tape printer. The handheld terminal 10 includes an operation button 12 operable by the user and a touch panel portion 13 having a liquid crystal display, etc.

As shown in FIG. 1, the label producing apparatus 20 receiving talk data from the handheld terminal 10 comprises: a display portion 22 in the form of a liquid crystal display for example, displaying the talk data, various pieces of information, or various messages; an operating portion 23 enabling the user to perform various operations; and a cut lever 24 for driving a cutter 27 (see FIG. 3 described later) disposed inside a device body 21.

The operating portion 23 includes various function keys 23a including input keys for the input of letters, symbols, numerals, predetermined instruction operations, etc.

<Functional Configuration of Handheld Terminal>

A functional configuration of the handheld terminal 10 is shown in FIG. 2. The handheld terminal 10 has a control circuit 14, a memory 15 storing various types of information, a communication control portion 16, an operation detecting portion 17, the operation button 12, and the touch panel portion 13.

The communication control portion 16 controls information communication with the label producing apparatus 20 connected thereto via wireless communication (or wire communication). Although connected to the label producing apparatus 20 via wireless communication by a wireless LAN pursuant to standards such as Wi-Fi (registered trademark) in a manner capable of sending and receiving information in the example of FIG. 1, the communication control portion 16 may otherwise be connected thereto via wire communication pursuant to the standards such as universal serial bus (USB).

The memory 15 is in the form of a non-volatile memory such as electrically erasable programmable read-only memory (EEPROM) whose storage content can be added and erased. This memory 15 stores various programs including an instant messaging app described later.

The control circuit 14 includes a CPU, RAM, and ROM that are not shown. This control circuit 14 executes the various programs stored in advance in the ROM, by a computing function of the CPU, while utilizing a temporary storage function of the RAM.

The touch panel portion 13 has a predetermined operation function and a predetermined display function.

<Functional Configuration of Label Producing Apparatus>

A functional configuration of the label producing apparatus 20 is shown in FIG. 3. In FIG. 3, the label producing apparatus 20 includes a control circuit 25, a memory 26 storing various pieces of information, a communication control portion 28, the display portion 22, the operating portion 23, the cut lever 24, a cartridge holder 32, a feeding device 29, a printing head 30, and a cutter 27.

The communication control portion 28 controls information communication with the handheld terminal 10 connected thereto via wireless or wire as the above.

The control circuit 25 includes a CPU (equivalent to a computing device), a RAM, and a ROM (equivalent to a recording medium) that are not shown. This control circuit 25 executes various programs stored in advance in the ROM, while utilizing a temporary storage function of the RAM. This allows the control circuit 25 to control the entire label producing apparatus 20. The various programs include a label production processing program (equivalent to a talk data processing program) for executing procedures shown in e.g. FIGS. 4 and 16 described later. The control circuit 25 is connected via the communication control portion 28 to the handheld terminal 10 so as to be able to receive talk data received from the handheld terminal 10.

The memory 26 is in the form of a non-volatile memory such as electrically erasable programmable read-only memory (EEPROM) whose storage content can be added and erased. This memory 26 can store talk data and print data sent from the handheld terminal 10.

The cartridge holder 32 is configured to allow a cartridge 31 capable of supplying a tape 33 (equivalent to a print-receiving tape) to be removably attached thereto. The cartridge 31 includes a tape roll 34 (shown by concentric circles in a simplified manner although intrinsically spiral) obtained by winding the tape 33 around a reel member not shown.

The feeding device 29 (equivalent to a feeder) is disposed facing the printing head 30. This feeding device 29 is controlled by the control circuit 25 to transport the tape 33 fed out and supplied from the tape roll 34 of the cartridge 31 attached to the cartridge holder 32.

The printing head 30 is controlled by the control circuit 25 to form desired print on the tape 33 fed out from the tape roll 34 and transported by the feeding device 29.

In response to the user's operation of the cut lever 24, the cutter 27 cuts the tape 33 on which printing by the printing head 30 is completed, to obtain a print label (see FIG. 7, etc. described later).

The display portion 22 (equivalent to a display device) displays various types of information including talk data received from the handheld terminal 10 and an operation screen.

The operating portion 23 accepts various operations through the user's pressing operation of the input keys and the function keys 23a.

<Print Label Production Procedure>

FIG. 4 is a flowchart showing an example of a control procedure executed by the control circuit 25 of the label producing apparatus 20 at the time of print label production. The procedure shown in this flow is started when the user outputs a label production instruction to the label producing apparatus 20 after generating print data through conversion and edit, described later, of talk data received from the handheld terminal 10.

In FIG. 4, first at step S10, the control circuit 25 outputs a control signal to the feeding device 29 to start feeding out of the tape 33 from the tape roll 34 of the cartridge 31 attached to the cartridge holder 32, i.e. transport of the tape 33.

The procedure then shifts to step S20 at which the control circuit 25 determines whether the tape 33 is transported by a predetermined amount. The predetermined amount refers to e.g. a transport distance (a transport amount for a so-called front margin) for a leading end of a print area not shown of the tape 33 to reach a position substantially facing the printing head 30. Determination at step S20 is negative until the predetermined amount of transport is achieved (S20:NO), and if the predetermined amount of transport is achieved after loop wait, determination at step S20 becomes affirmative (S20:YES), shifting to step S30.

At step S30, the control circuit 25 outputs a control signal to the printing head 30, allowing the printing head 30 to start print of print data stored in the memory 26 on the print area of the tape 33 transported by the feeding device 29.

Subsequently, at step S40, the control circuit 25 determines whether print of print data on the print area of the tape 33 by the printing head 30 started at step S30 is all completed. Until the print is all completed, determination at step S40 is negative (S40:NO), and if the print is all completed after loop wait, determination at step S40 becomes affirmative (S40:YES), shifting to step S50.

At step S50, the control circuit 25 determines whether the tape 33 is further transported by a predetermined amount (e.g. a transport distance for all of the print area to exceed the cutter 27 by a predetermined length; a transport amount for a so-called rear margin). Until the predetermined amount of transport is achieved, determination at step S50 is negative (S50:NO), and if the predetermined amount transport is achieved after loop wait, determination at step S50 becomes affirmative (S50:YES), shifting to step S60.

At step S60, the control circuit 25 outputs a control signal to the feeding device 29 to stop feeding out of the tape 33 from the tape roll 34 started at step S10, i.e. transport of the tape 33.

At step S70, the control circuit 25 outputs a display signal to the display portion 22, allowing a display that the tape 33 is cuttable by the operation of the cut lever 24. Thereafter, the procedure shown in this flow comes to an end. When the user operates the cut lever 24 in accordance with the display, the cutter 27 is actuated to cut the tape 33. This cutting by the cutter 27 cuts off an area where print is formed by the printing head 30 from the tape 33, to produce a print label.

<Feature of this Embodiment>

As described above, the instant messaging app is executed on the handheld terminal 10 to generate talk data, which in turn is received by the label producing apparatus 20 to be printed on the tape 33, to produce a print label. A feature of this embodiment lies in that the label producing apparatus 20 automatically converts the configuration or arrangement of each speech related data (described later) included in the received talk data so as to be adapted to the print on the tape 33 and then generates print data by way of the user's optional edit process so that printing becomes feasible. Hereinafter, the details thereof will be described in order with reference to FIGS. 5 to 16.

<Display Example of Talk Data in Instant Messaging App>

FIG. 5 shows a display example of talk data on the touch panel portion 13 when the handheld terminal 10 executes the instant messaging app.

In FIG. 5, the touch panel portion 13 is of a rectangular shape having a long vertical dimension in top-bottom direction in the diagram and having a shorter width dimension in left-right direction in the diagram. The vertically long touch panel portion 13 has, in the vicinity of its right-hand edge in the diagram, speech related data M2, M4, and P4 posted by the user himself/herself (own side; equivalent to a first speaker) of the handheld terminal 10 (and the label producing apparatus 20), whereas it has, in the vicinity of its left-hand edge in the diagram, speech related data M1, P1, P2, P3, and M3 posted by a speaker (other party; equivalent to a second speaker) other than that user. All of the speech related data M1-M4 and P1-P4 are arrayed and displayed from top toward bottom of the diagram in the order of posting in the time series. These speech related data M1-M4 and P1-P4 are all of data posted during a certain one day (e.g. May 8, 2016 as described later) (details will be described later).

Examples of the type of individual speech related data postable by each speaker include: a speech display text posted as a text and displayed inside a balloon; a posted image posted as a stamp that is a given selection image or as a still image picked up by camera; a posted video (see FIG. 15 described later) posted as a video image picked up by camera; and a posted URL (see FIG. 14 described later) posted as a uniform resource locator (URL) that is an access code to a WEB site.

In the example of FIG. 5, the speech display text M1 of "GOOD MORNING" and the posted image P1 in the form of a stamp of chicken, posted by other party are successively displayed on the left side (other party side) on the touch panel 13 in the top-to-bottom order, i.e. in the posting order.

The speech display text M2 of "GOOD MORNING" posted by the user is then displayed on the right side (own side). Subsequently, the posted image P2 of a stamp of cracker, the posted image P3 of a stamp of cake, and the speech display text M3 of "HAPPY BIRTHDAY", posted by other party are successively displayed on the other side. Subsequently, the speech display text M4 of "THANKS. MY FRIENDS ARE THROWING PARTY FOR ME TODAY. THEY'LL MAKE CAKE." and the posted image M4 of a stamp resembling a human face, posted by the user are successively displayed on the user side.

As above, the instant messaging app acts to manage, by speaker and in the posting order along the time series, all of the plural pieces of speech related data M1-M4 and P1-P4 posted individually by the user and other party, to generate and store them as talk data and display the talk data in a corresponding array by speaker and in the posting order. In this talk data display, speech related data at any time-series position among the talk data can be displayed by user's scrolling operation on the touch panel portion 13. The speaker(s) of other party may be a single person or a plurality of persons. Thus, the talk data is generated as data capable of recording and displaying one-to-one conversation or conversion in a group of a specific number of people.

<Example of Talk Data Print by App Mode of Label Producing Apparatus>

As described above, the label producing apparatus 20 of this embodiment reads out and receives talk data generated by the instant messaging app running on the handheld terminal 10. This readout of the talk data may be performed by a program on the label producing apparatus 20 or may be performed by a separate app installed in the handheld terminal 10.

The talk data received by the label producing apparatus 20 is automatically converted to an app mode described later so as to be suitable for printing on the tape 33 in configuration and arrangement of each speech related data.

The app mode is a mode converting the talk data such that the plural pieces of speech related data M1-M4 and P1-P4 included in the talk data are arrayed on the tape in conformity with the above arrangement rule, while taking confronting postures in which their respective vertical directions correspond to the tape width direction. Although in FIG. 6, all of the talk data are shown for the convenience of explanation, the display portion 22 displays only a preview display within the interior thereof (only a display inside a black frame line in FIG. 6).

Therefore, in the talk data converted to the app mode, as shown in FIG. 6, the left-right direction of the diagram corresponds to the length direction (transport direction) of the tape while the top-bottom direction of the diagram corresponds to the tape width direction. The speech related data M1-M4 and P1-P4 are arranged on the tape, on which the vicinity of its lower edge in the diagram is own side and the vicinity of its upper edge in the diagram is other party side, in the order of posting along the time series, from left toward right in the diagram (from downstream side toward upstream side in the transport direction). The speech related data M1-M4 and P1-P4 are displayed on the display portion 22 in respective confronting postures in which respective top-bottom directions correspond to the tape width direction.

Thus, in this talk data, the plural pieces of speech related data M1-M4 and P1-P4 are arrayed in the order of time series along the tape length direction in such a manner that the speech related data M2, M4, and P4 (equivalent to first speech related data) posted from the user and the speech related data M1, M3, and P1-P3 (equivalent to second speech related data) posted from other party are displayed in mutually different forms. The difference in display form between the user's speech related data M2, M4, and P4 and the speech related data M1, M3, and P1-P3 of other party is a difference in the arrangement position in the tape width direction (equivalent to a first direction). Specifically, the speech related data M2, M4, and P4 posted from the user are positioned toward one side (lower side) in the tape width direction, whereas the speech related data M1, M3, and P1-P3 posted from other party are positioned toward the other side (upper side) in the tape width direction.

This talk data includes at least one piece of speech related data (MB1-MB4, PB1-PB4) including the speech display texts M1-M4. In the at least one piece of speech related data, the speech display text is displayed by a sentence extending in the tape length direction (equivalent to a second direction) across a plurality of rows in the tape width direction. Since in the speech display text M4 shown in FIG. 5, the original sentence across six rows does not fit in the tape width, it is divided into two text blocks M4a and M4b juxtaposed in the tape width direction, as shown in FIG. 6. If the number of rows of a specific speech display text M4 is not less than a predetermined number (four in this example) corresponding to the tape width of the tape 33, the specific speech display text M4 is divided into two text blocks M4a and M4b whose maximum number of letters in the tape length direction is not more than a predetermined number of letters, with the second text block M4b (equivalent to a second text) being arrayed on the right side (upstream side in the transport direction; equivalent to one side in the second direction) of the first text block M4a (equivalent to a first text) in the tape length direction.

Print data is generated based on such app mode talk data. The label producing apparatus 20 prints this print data on the tape 33 in accordance with the control procedure shown in FIG. 4, to produce a print label. For example, in the case that print data is generated for the print on the tape 33 after conversion of talk data of the example shown in FIG. 5 to app mode (described later), a print label LB as shown in FIG. 7 is produced. In the print data printed on the print label LB of the shown example, the left-right direction in the diagram corresponds to the length direction (transport direction) of the tape 33, while the top-bottom direction in the diagram corresponds to the width direction of the tape 33. With the vicinity of a lower edge of the tape 33 in the diagram being imparted to the user side, the vicinity of an upper edge in the diagram being imparted to other party side, the speech related data M1-M4 and P1-P4 are arranged respectively as print objects MB1-MB4 and PB1-PB4 from left toward right in the diagram (from the downstream side toward the upstream side in the transport direction) in the order of posting along the time series. The print objects MB1-MB4 and PB1-PB4 are printed with confronting postures in which their respective top-bottom directions correspond to the tape width direction.

In this print data, the plural pieces of speech related data M1-M4 and P1-P4 are arrayed respectively as the print objects MB1-MB4 and PB1-PB4 along the tape length direction in the order of time series, with the print objects MB2, MB4, and PB4 of the speech related data M2, M4, and P4 posted from the user included in the talk data being printed in a form mutually different from that of the print objects MB1, MB3, and PB1-PB3 of the speech related data M1, M3, and P1-P3 posted from other party included in the talk data. In the shown example of this embodiment, the difference in print form between the print objects MB2, MB4, and PB4 of the user and the print objects MB1, MB3, and PB1-PB3 of other party is a difference in arrangement position in the tape width direction. Specifically, the print objects MB2, MB4, and PB4 posited from the user is arranged toward one side (lower side) in the tape width direction, whereas the print objects MB1, MB3, and PB1-PB3 are arranged toward the other side (upper side) in the tape width direction.

<Example of Talk Data Edit by App Mode of Label Producing Apparatus>

Before generating print data after automatic conversion to the app mode of the configuration and arrangement of each speech related data of talk data received from the handheld terminal 10, the label producing apparatus 20 of this embodiment displays the converted talk data on the display portion 22 so that the user can optionally edit the configuration and arrangement of each speech related data.

Although the handheld terminal 10 can continuously store vast amounts of long-term data, limitation is imposed on the length of the talk data which can be displayed on the display portion 22 for editing and printing. For this reason, after the label producing apparatus 20 receives talk data, a selection screen as shown in FIG. 8 is displayed so that a time series range of talk data to be converted, edited, and printed can be selected. The shown example enables either partial selection specifying a partial time series range or all selection specifying all time series range to be selected. In the case of the partial selection, a start date ("START" in the diagram) and an end date ("END" in the diagram) of the time series range can separately be specified (in the shown example, each specified to the same date "2016.05.08").

In the case that the partial selection is selected and the speech related data M1-M4 and P1-P4 appearing on the touch panel portion 13 in FIG. 5 are all of the speech related data posted on May 8, 2016 that is the time series range, an app mode edit screen is displayed as an initial display as shown in FIG. 9A on the display portion 22. With the oldest speech related data M1 among talk data that are app-mode converted correspondingly to the specified timer-series range (for May 8) being arranged at the head, a preview display screen of talk data of a length displayable by the display portion 22 is initially displayed on the display portion 22. In the preview display, a display containing the oldest speech related data M1 among the speech related data M1-M4 and P1-P4 in the timer-series range appears scrollably toward the latest speech related data P4.

In this initial display, a cursor C in a semi-transmissive display (or reversed display) is superimposedly displayed in an arrangement overlying the oldest speech related data M1. This cursor C can be moved every speech related data in the tape length direction when the user operates a cursor movement key (not shown in particular) included in the function keys 23a of the operating portion 23, and the entire preview screen of talk data can be scrolled by performing a movement operation so as to move the cursor on from either position of right or left end of the display portion 22. A normal mode switching virtual button V described later is displayed at an upstream end of the talk data in the tape transport direction, i.e. at a position further upstream (rightward) of the latest speech related data P4. The normal mode switching virtual button V is initially displayed scrollably to the left in the tape length direction, integrated with all the speech related data.

When all selection is selected as the time series range, an app mode edit screen appears as an initial display as shown in FIG. 9B on the display portion 22. With the normal mode switching virtual button V being arranged at the tail end (upstream end in the tape transport direction), a print data preview display screen of a length displayable by the display portion 22 from the latest speech related data among app mode converted talk data is initially displayed on the display portion 22. In the initial display in this case, the cursor C is superimposedly displayed in an arrangement overlying the latest speech related data P4. In the preview display, a display containing the latest speech related data P4 among all of the speech related data appears scrollably toward the oldest speech related data. By proceeding with scrolling, all the speech related data contained in the talk data are displayed in at least a predetermined display size on the display portion 22 without reduction processing. In the shown example, data ahead of the speech related data M1 are not shown.

Also when partial selection is selected, although not shown in particular, in the preview display, a display containing the latest speech related data P4 may initially be displayed scrollably toward the oldest speech related data M1. Even if all selection is selected, although not shown in particular, in the preview display, a display containing the oldest speech related data among all the speech related data may initially be displayed scrollably toward the latest speech related data P4. Even if either of partial selection or all selection is selected, when the entirety does not exceed the display range of the display portion due to less number of speech related data contained in the app mode talk data, the initial display may fixedly be imparted in an unscrollable manner.

In the preview display, when the cursor C is moved and superimposed on predetermined speech related data, an editing menu E as shown in FIG. 10 can be displayed below the cursor C on the display portion 22 by pressing an edit key not shown in particular included in the function keys 23a of the operating portion 23. The editing menu E of the shown example includes four process menus Ea-Ed which are arrayed and displayed in top-bottom direction. The process menu Ea allows "leftward move" (equivalent to a move process) by which speech related data to be edited at that point of time is replaced with one next to the left; the process menu Eb allows "rightward move" (equivalent to the move process) by which speech related data to be edited at that point of time is replaced with one next to the right; the process menu Ec allows "delete" (equivalent to a delete process) by which that speech related data to be edited is deleted to eliminate the space between neighbors; and the process menu Ed allows "reverse" (equivalent to a reverse process) by which the orientation of the left-right direction (tape length direction) of that speech related data is reversed.

The user moves the cursor C in top-bottom direction to select one of the process menus Ea-Ed to depress a separate enter key, to thereafter perform an edit process corresponding to the selected process menu for the speech related data to be edited so that the edit process can be reflected on the preview display. Thus, this app mode edit screen accepts at least one process of the move process (rightward move or leftward move) in the tape length direction, the delete process, and the reverse process, for each of the plural pieces of speech related data arrayed along the tape length direction in the preview display.

For example, editing to talk data as shown in FIG. 11A is feasible by leaving only the speech display text M1 and the posted image P1 among talk data of FIG. 6 corresponding to the print data shown in FIG. 7, to delete the other speech related data; moving either the speech display text M1 or the posted image P1 for positional replacement thereof (rightward move of M1 or leftward move of P1); and reversing the orientation of the posted image P1 in the left-right direction.

Editing to talk data as shown in FIG. 11B is feasible by leaving only the posted images P2 and P3 and the speech display text M3 among talk data shown in FIG. 6 to delete the other speech related data; and performing a rearrangement (e.g. a move to interchange the two posted images P2 and P3→a move to interchange the posted image P2 and the speech display text M3→a move to interchange the posted image P3 and the speech display text M3) so as to interchange the positions of the posted image P2 and the speech display text M3 lying on both sides of the posted image P3.

The specific process menus for edit process may include a wide variety of menus without being limited to the above. Although not shown in particular, a process menu may be provided for example that retrieves and extracts only data satisfying any conditions (e.g. by speaker, or by type of the speech related data) among many pieces of speech related data contained in the talk data. This enables: extraction of only speech display texts of the user and other party; extraction of a speech display text and a stamp associated with each other; extraction of only an image-based speech related data such as a stamp, a posted image, and a posted video; and extraction of only a speech display text.

<Talk Data Edit and Print Examples by Normal Mode of Label Producing Apparatus>

In the label producing apparatus 20 of this embodiment, talk data after app mode conversion can undergo normal mode edition in which the content and format of esp. the speech display text contained in the talk data is edited. In this case, as shown in FIG. 12, the user specifies a group of speech related data containing at least one piece of speech display text to thereafter superimpose the cursor C on the normal mode switching virtual button V (equivalent to a shift operating portion) for enter operation, to thereby switch the display from the app mode edit screen to the normal mode edit screen.

The normal mode edit screen (equivalent to a text edit screen) shown in the lower half of FIG. 12 is a publicly known so-called real-time preview screen, which is a screen on which a text is previewed and edited in such a manner as to reflect intactly in real time the content of print at the time of generating print data, i.e. the format such as font and point set at that point of time. In the normal mode screen of the shown example, a balloon encircling the speech display text on the talk data is erased. A cursor CV of a shape (vertical line-like in the shown example) from the case of the app mode edit screen is displayed on the normal mode edit screen.

This normal mode edit process can perform text editing feasible by the existing label producing apparatus 20. For example, by applying an increased font size and an italic style to a text "HAPPY BIRTHDAY" shown in FIG. 13A, editing into a form shown in FIG. 13B becomes feasible. Print data is then generated on the basis of the content of this edition so that a print label LB as shown in FIG. 13C can be produced.

<About Print Data Generation>

As described above, while talk data is converted and edited in app mode and normal mode, the user depresses a predetermined print key for printing operation, to thereby generate print data reflecting the content of editing of talk data up to that time, which print data is printed on the tape 33. At the time of this print data generation, however, based on the display form of each speech related data of the app mode talk data on the preview screen, the print form of a corresponding print object may be changed so as to fit for print on the actual print label LB.

For example, as shown in FIG. 14, in the case that the talk data contains speech related data U1 of a posted URL, URL information as the app mode talk data is previewed unchangedly in a text format display form, whereas URL information as the print data may be changed to a print object UB1 in the form of an encoded image that is bar-coded with QR code (registered trademark), etc. as shown. It is noted that the pattern of the QR code in FIG. 14 is shown as an example in a simulated manner and does not directly correspond to the URL information.

For example, as shown in FIG. 15, in the case that the talk data contains speech related data D1 of a posted video, video information as the app mode talk data is displayed unchangedly reproducibly on the display portion 22 (a play button appears in an icon of the posted video D1), whereas video information as the print data may be changed to a print object DB1 in the form of a representative still image of the posted video. Although not shown in particular, video information as the print data may be changed to a print object in which a plurality of still images of the posted video are arranged as frame-by-frame advance in the time series order.

The user may optionally set in advance whether conversion between the speech related data and the print object is to be made at the time of print data generation as above and how to convert.

<Control Procedure>

Referring to FIG. 16, description will be given of a control procedure of talk data edit/print processing executed by the CPU of the control circuit 25 of the label producing apparatus 20 for the purpose of implementing the above talk data processing technique. Processing of FIG. 16 starts when the user inputs an operation to instruct the device 20 to receive talk data from the handheld terminal 10.

In FIG. 16, first at step S105, the CPU of the control circuit 25 receives talk data from the handheld terminal 10 via wireless communication by the communication control portion. After step 105 terminates, the procedure shifts to step S110.

At step 110, the CPU of the control circuit 25 displays the selection screen shown in FIG. 8 on the display portion 22 and accepts an input to specify the time series range (or all selection). After step 110 terminates, the procedure shifts to step S115.

At step S115, the CPU of the control circuit 25 converts talk data received at step 105 to app mode talk data in a time series range specified at step S110 (in all the talk data in the case of all selection) (see FIG. 9, etc.). After step 115 terminates, the procedure shifts to step S120.

At step S120, the CPU of the control circuit 25 determines whether selection at step 115 is partial selection, i.e. whether a range is specified. If the range is specified by partial selection, the determination becomes affirmative (S120: YES), allowing the procedure to shift to step S125.

At step S125, the CPU of the control circuit 25 displays the app mode edit screen on the display portion 22 as shown in FIG. 9A and, in the preview display thereof, displays an initial display containing the oldest speech related data among speech related data lying in the time series range, scrollably toward the latest speech related data. After step 125 terminates, the procedure shifts to step S135.

On the other hand, if no range is specified as a result of selection of all selection, the determination at step S120 is negative (S120:NO), allowing the procedure to shift to step S130.

At step S130, the CPU of the control circuit 25 displays the app mode edit screen on the display portion 22 as shown in FIG. 9B and, in the preview display thereof, displays an initial display containing the latest speech related data among all the speech related data, scrollably toward the oldest speech related data. After step 130 terminates, the procedure shifts to step S135.

At step S135, the CPU of the control circuit 25 determines whether a depressing operation of the cursor movement key (abbreviated as "cursor operation" in the diagram) is input in the operating portion 23. If the cursor operation is not input, the determination goes negative (S135:NO), allowing the procedure to shift to step S145.

On the other hand, if the cursor operation is input, the determination is affirmative (S135:YES), allowing the procedure to shift to step S140.

At step S140, the CPU of the control circuit 25 moves and displays the position of the cursor C on the display portion 22, every speech related data, in a direction corresponding to the cursor movement key whose input is determined at S135. If, when the position of the cursor at that point of time lies on one of the ends of the display portion 22, an operation to further move to the one end is input, the CPU of the control circuit 25 displays the entire preview display scrolling toward a corresponding direction. After step 140 terminates, the procedure shifts to step S145.

At step S145, the CPU of the control circuit 25 determines whether a depressing operation of the edit key (abbreviated as "edit operation" in the diagram) is input in the operating portion 23. If the edit operation is not input, the determination goes negative (S145:NO), allowing the procedure to shift to step S155.

On the other hand, if the edit operation is input, the determination is affirmative (S145:NO), allowing the procedure to shift to step S150.

At step S150, the CPU of the control circuit 25 leaves the app mode edit screen on the display portion 22 to display an edit process menu below the cursor position at that point of time. The CPU performs an edit process in accordance with a process menu selected by the user. After step 150 terminates, the procedure shifts to step S155.

At step S155, the CPU of the control circuit 25 determines whether a depressing operation (abbreviated as "normal mode operation" in the diagram) of the enter key is input with the cursor C lying on the normal mode switching virtual button V on the display portion 22. If the normal mode operation is not input, the determination goes negative (S155:NO), allowing the procedure to shift to step S165.

At step S165, the CPU of the control circuit 25 determines whether a depressing operation of the print key (abbreviated as "print operation" in the diagram) is input in the operating portion 23. If the print operation is not input, the determination goes negative (S165:NO), allowing the procedure to return to step S135, to repeat the similar procedure.

If the print operation is input, the determination is affirmative (S165:YES), allowing the procedure to shift to step S170 described later.

On the other hand, if the normal mode operation is input, the determination becomes affirmative (S155:YES), allowing the procedure to shift to step S160.

At step S160, the CPU of the control circuit 25 switches the screen to the normal mode edit screen on the display portion 22, to display thereon speech related data specified as an edit target in advance. The CPU then performs an edit process for a text in a speech display text contained in the speech related data. After step 160 terminates, the procedure shifts to step S170.

At step S170, the CPU of the control circuit 25 generates print data, based on talk data that has been edited at that point of time. Basically, print objects are generated and arranged so as to reproduce the configuration and arrangement of each of the speech related data contained in the talk data at that point of time. Specific speech related data such as the posted URL and posted video are each converted to a print object of a previously set configuration (QR code for the posted URL; representative still image, etc. for the posted video). After step 170 terminates, the procedure shifts to step S175.

At step S175, the CPU of the control circuit 25 executes the label production process shown in FIG. 4 to print the print data generated at step S170 on the tape 33, to consequently produce a print label LB. This flow then comes to an end.

In the above, the procedure at step S105 is equivalent to a data reception step as defined in claims, and the CPU executing this step functions as a data receiving portion. The processes at steps S115, S125, and S130 are equivalent to a display control step as defined in claims, and the CPU executing this step functions as a display control portion. The CPU executing the process at step S110 functions as a range accepting portion as defined in claims; the CPU executing the process at step S145 functions as a process accepting portion as defined in claims; and the CPU executing the processes at steps S170 and S175 functions as a print control portion as defined in claims.

Although in the above embodiment, respective arrangement positions of speech related data posted by the user himself/herself possessing the handheld terminal 10 and speech related data posted by speakers other than the user are distinguished from each from a difference in display form where they are separately allocated to one side (lower side) and the other side (upper side) in the tape width direction, the present disclosure is not limited thereto. Otherwise, although not shown in particular, a different in display form may be provided such as, for example: imparting mutually different types (shapes, colors, etc.) of frames for distinction; using mutually different background colors for distinction; or imparting mutually different marks (symbol graphics, the presence/absence or the types of underlines, etc.) for distinction.

As has already been described, if plural pieces of speech related data to be displayed have a length beyond the display range of the display portion 22, a display containing the latest speech related data among the plural pieces of speech related data may be displayed scrollably toward the oldest speech related data in the preview display.

The present disclosure is not intended to be limited to the above embodiment and could variously be modified without departing from the spirit and technical idea thereof.

For example, in the above embodiment, the handheld terminal 10 includes the touch panel portion 13 so that the instant messaging app displays talk data on the touch panel portion 13, with speech related data at any time-series position being displayed by user's scrolling operation. In the same manner, the label producing apparatus 20 may also include the touch panel portion 13 so that received talk data can be displayed on the touch panel portion 13 to allow the user's scrolling operation. In this case, talk data converted to app mode as shown in FIGS. 9A and 9B may be displayed and scrolled in the left-right direction. Otherwise, with the same layout as that of the handheld terminal 10 remaining intact as shown in FIG. 17 (i.e. without conversion to the app mode), talk data may be displayed and scrolled in the top-bottom direction. In either case, the cursor C may be displayed so that scrolling operation also becomes feasible by moving the cursor or so that the range of an editing target or a printing target can be specified by operating the cursor.

Although in the above embodiment, the handheld terminal 10 activates the instant messaging app to generate talk data, the present disclosure is not limited thereto. Otherwise, a similar instant messaging app may be activated on a personal computer such as a desktop PC or a notebook PC to generate talk data so that the label producing apparatus 20 can receive the talk data from the personal computer.

In the above, arrows shown in FIGS. 2 and 3 indicate an example of signal flow and is not intended to limit the direction of signal flow.

The flowcharts shown in FIGS. 4 and 16 are not intended to limit the present disclosure to the processes of the flows, any processes may be added or deleted or the order may be changed for example, without departing from the spirit and technical idea of the present disclosure.

Other than those that have already been described, the techniques of the above embodiment and modification examples may appropriately be combined for use.

Otherwise, although not exemplified one by one, the present disclosure may be carried out with various changes without departing from the sprit thereof.

What is claimed is:

1. A tape printer comprising:
   a feeder configured to feed a print-receiving tape;
   a printing head configured to perform printing on said print-receiving tape fed by said feeder;
   a display device configured to perform a desired display;
   a processor; and
   memory having computer readable instructions stored thereon that, when executed by the processor, cause the tape printer to operate as:
      a data receiving portion configured to receive talk data via wireless communication, said talk data containing plural pieces of speech related data along a time series, said speech related data including at least one of speech display texts, a posted image, a posted video, and a posted uniform resource locator (URL) from each of a plurality of speakers including a first speaker and a second speaker;
      a display control portion configured to control said display device so that a preview display of said print-receiving tape is performed, at least some of said plural pieces of speech related data contained in said talk data along said time series is arrayed and displayed in order of said time series along a tape length direction in said preview display, and first speech related data in relation to said first speaker contained in said talk data and second speech related data in relation to said second speaker contained in said talk data are displayed in mutually different forms; and
      a print control portion configured to control said printing head so as to form on said print-receiving tape a plurality of print objects arrayed along said tape length direction, the print objects corresponding respectively to said plural pieces of speech related data arrayed long said tape length direction in said preview display of said display device.

2. The tape printer according to claim 1, wherein said display device is configured to display said first speech related data so as to be offset-arranged in one side in a first direction along a tape width direction, and display said second speech related data so as to be offset-arranged in the other side in said first direction, in said preview display based on control of said display control portion.

3. The tape printer according to claim 2, wherein
   said display device is configured to display at least one piece of said speech related data including speech display text, based on control of said display control portion, and wherein
   in said at least one piece of said speech related data, said speech display text is configured to be displayed in the form of a sentence extending in a second direction along the tape length direction and lying through a plurality of rows in said first direction.

4. The tape printer according to claim 3, wherein in a case that a number of said plurality of rows of a specific speech display text is equal to or greater than a predetermined number corresponding to a tape width of said print-receiving tape in said preview display, said display device is configured to divide said specific speech display text into a first text and a second text and to array and display said second text to one side from said first text in said second direction based on control of said display control portion, wherein each of said first text and said second text has a maximum number of letters in said second direction equal to or less than a predetermined number of letters.

5. The tape printer according to claim 1, wherein the computer readable instructions, when executed by the processor, cause the tape printer to operate as:
   a process accepting portion configured to accept at least one process among a move process in said tape length direction, a delete process, and a reverse process of display orientation, for each of said plural pieces of speech related data arrayed along said tape length direction in said preview display of said display device,
   wherein said display device is configured to display said plural pieces of speech related data along said time series contained in said talk data in said preview display based on control of said display control portion, in such a manner as to reflect said process accepted by said process accepting portion.

6. The tape printer according to claim 1, wherein the computer readable instructions, when executed by the processor, cause the tape printer to operate as:
   a range accepting portion configured to accept a specification of a time series range of said plural pieces of speech related data to be displayed in said preview display,
   wherein said display device is configured to display speech related data lying within said time series range accepted by said range accepting portion among said plural pieces of speech related data along said time series contained in said talk data, in said preview display, based on control of said display control portion.

7. The tape printer according to claim 1, wherein said display device is configured to display all of said plural pieces of speech related data contained in said talk data along said time series at a predetermined or greater display size without a reduction process, in said preview display, based on control of said display control portion.

8. The tape printer according to claim 6, wherein in a case that said plural pieces of speech related data to be displayed have a length beyond a display range of said display device, said display device is configured to display a display containing oldest speech related data among said plural pieces of speech related data, scrollably toward latest speech related data, in said preview display, based on control of said display control portion.

9. The tape printer according to claim 6, wherein in a case that said plural pieces of speech related data to be displayed have a length beyond a display range of said display device, said display device is configured to display a display containing latest speech related data among said plural pieces of speech related data, scrollably toward oldest speech related data, in said preview display, based on control of said display control portion.

10. The tape printer according to claim 1, wherein
said display device is configured to display at least one piece of speech related data including said posted URL, based on control of said display control portion, and
said printing head is configured to form a bar-coded image of said posted URL as said print object on said print-receiving tape based on control of said print control portion.

11. The tape printer according to claim 1, wherein said display device is configured to display a shift operating portion configured to receive operation for instruction of shift to a text edit screen where an edit process for speech display text is executed on one side of said preview display in a tape length direction based on control of said display control portion, and to display said text edit screen in a case that said operation for instruction is performed to said shift operating portion.

12. The tape printer according to claim 11, wherein said display device is configured to display said shift operating portion on one side in said tape length direction and all pieces of said speech related data arrayed in said preview display, scrollably toward the other side in said tape length direction together with said all pieces of said speech related data, based on control of said display control portion.

13. The tape printer according to claim 11, wherein said display device is configured to display said speech display text within a balloon in said preview display and display said speech display text without said balloon on said text edit screen, based on control of said display control portion.

14. A non-transitory computer-readable recording medium, storing a talk data processing program for executing steps on a CPU included in a tape printer that has a feeder configured to feed a print-receiving tape, a printing head configured to perform printing on said print-receiving tape fed by said feeder, a display device configured to perform a desired display, and said CPU, said steps comprising:
receiving talk data via wireless communication, said talk data containing plural pieces of speech related data along a time series, said speech related data including at least one of speech display texts, a posted image, a posted video, and a posted uniform resource locator (URL) from each of a plurality of speakers including a first speaker and a second speaker; and
controlling said display device so that a preview display of said print-receiving tape is performed, at least some of said plural pieces of speech related data contained in said talk data along said time series is arrayed and displayed in order of said time series along a tape length direction in said preview display, and first speech related data in relation to said first speaker contained in said talk data and second speech related data in relation to said second speaker contained in said talk data are displayed in mutually different forms.

* * * * *